No. 796,641. PATENTED AUG. 8, 1905.
J. P. HALL.
MOLDING DEVICE.
APPLICATION FILED OCT. 28, 1904.
3 SHEETS—SHEET 1.
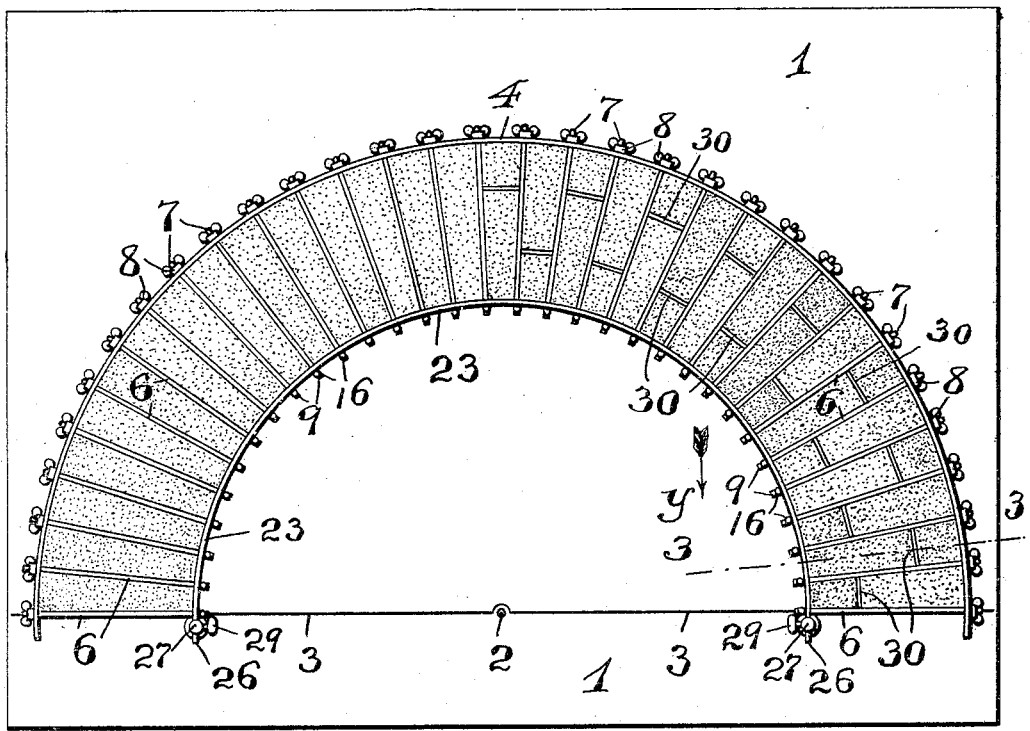
Fig. 1.
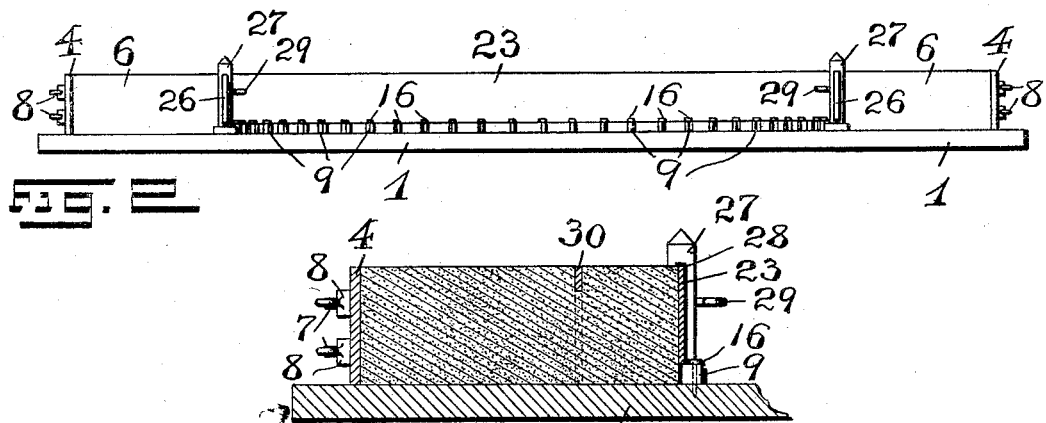
Fig. 2.
Fig. 3.
WITNESSES:
Geo. D. Richards
F. H. W. Fraentzel
INVENTOR:
James P. Hall,
BY Fred C. Fraentzel,
ATTORNEY

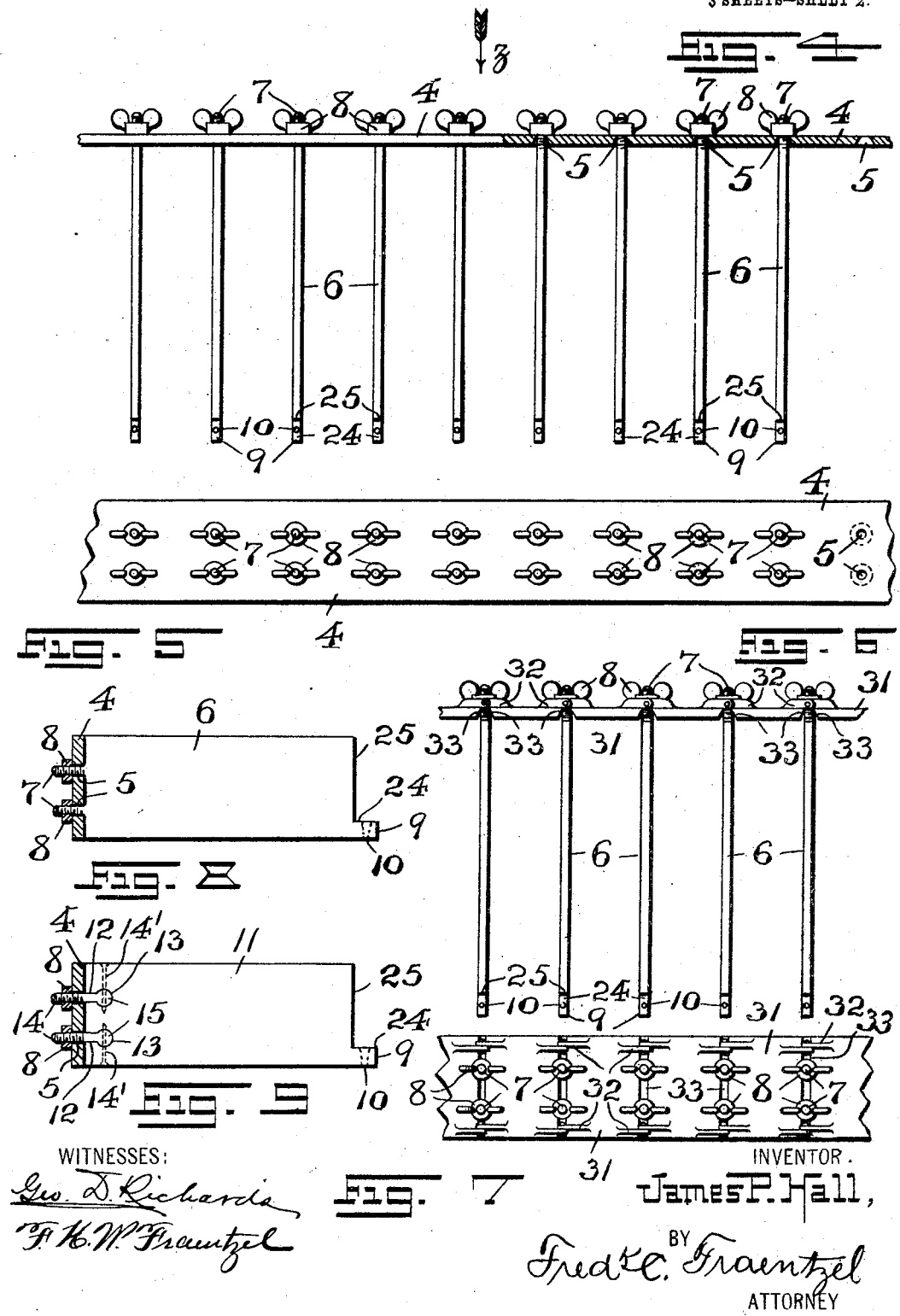

No. 796,641. PATENTED AUG. 8, 1905.
J. P. HALL.
MOLDING DEVICE.
APPLICATION FILED OCT. 28, 1904.
3 SHEETS—SHEET 3.
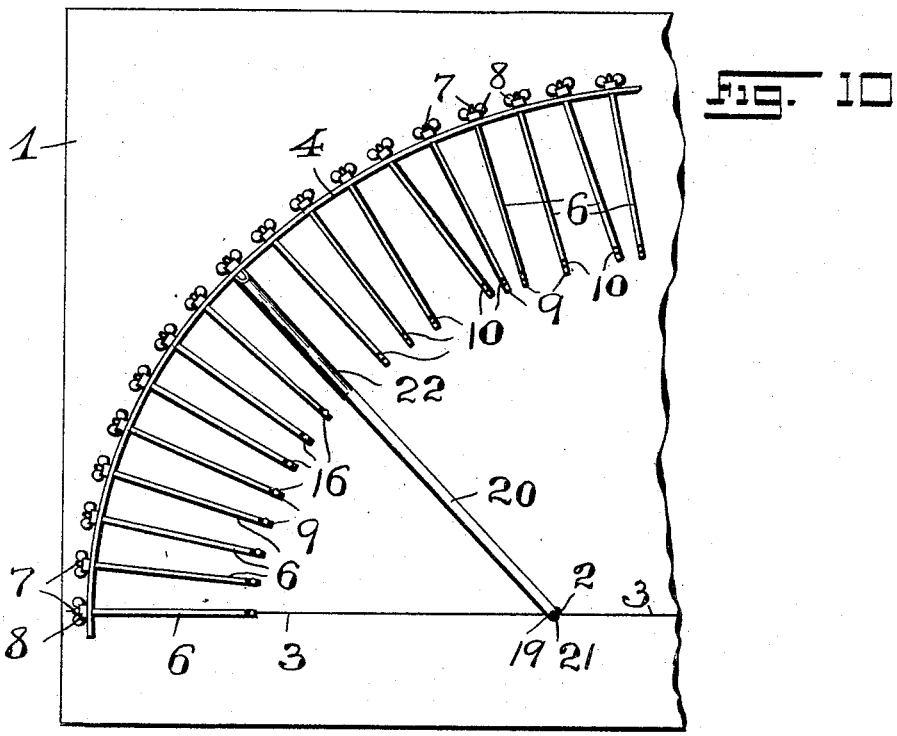
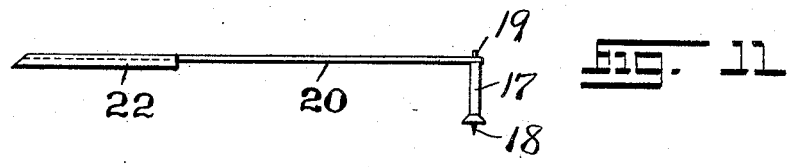
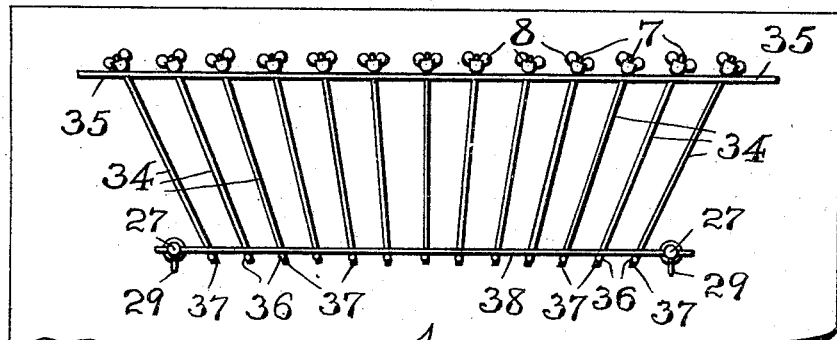
WITNESSES:
Geo. D. Richards
F. C. Fraentzel
INVENTOR:
James P. Hall,
BY
Fred C. Fraentzel
ATTORNEY

UNITED STATES PATENT OFFICE.

JAMES P. HALL, OF JERSEY CITY, NEW JERSEY.

MOLDING DEVICE.

No. 796,641. Specification of Letters Patent. Patented Aug. 8, 1905.

Application filed October 28, 1904. Serial No. 230,293.

*To all whom it may concern:*

Be it known that I, JAMES P. HALL, a citizen of the United States, residing at Jersey City, in the county of Hudson and State of New Jersey, have invented certain new and useful Improvements in Molding Devices; and I do hereby declare the following to be a full, clear, and exact description of the invention, such as will enable others skilled in the art to which it appertains to make and use the same, reference being had to the accompanying drawings, and to numerals of reference marked thereon, which form a part of this specification.

The present invention relates to a novel device or apparatus to be used for the purposes of molding or forming plastic and other suitable materials or matter into the forms of arch-stones or bricks to be used in arches in the building arts; and, furthermore, this invention relates to a novel device or appliance in the form of an adjustable mold in which concrete blocks and bricks made from a mixture of sand or any other suitable material can be molded into shape for use in arches of the various kinds.

The principal object of this invention is to provide a simple, cheap, and efficiently-constructed molding device, formed with adjustable partition-plates, which may be arranged to provide a number of molding-compartments to be adjusted and then set by the operator upon a molding board, table, or bed for the forming or molding of the bricks suitable for the various sizes and shapes of the arches for which the bricks are intended.

A further object of the present invention is to provide a device which can be easily manipulated to produce in rapid succession bricks of the required sizes and correct shapes at a great reduction of time and expense in the manufacture of the brick and at the same time producing a labor-saving device.

Other objects of this invention not at this time more particularly mentioned will be clearly understood from the following detailed description of the said invention.

With the various objects of my present invention in view the same consists in the novel molding device or apparatus hereinafter set forth; and, furthermore, this invention consists in the various arrangements and combinations of parts, as well as in the details of the construction of the same, all of which will be hereinafter more particularly described and then finally embodied in the clauses of the claim, which are appended to and form an essential part of the said specification.

The invention is clearly illustrated in the accompanying drawings, in which—

Figure 1 is a plan or top view of a molding device embodying the features of my present invention, showing the radial compartments of the same in their adjusted and fixed positions with the material molded therein; and Fig. 2 is a front view of the same looking in the direction of the arrow $x$ in said Fig. 1. Fig. 3 is a transverse vertical section in detail and on an enlarged scale, said section being taken on line 3 3 in said Fig. 1 looking in the direction of the arrow $y$. Fig. 4 is a detail view of certain parts of the molding device, partly in plan and partly in horizontal section, with the parts represented in their initial and normally inoperative positions; and Fig. 5 is a face view of the same looking in the direction of the arrow $z$ in said Fig. 4. Fig. 6 is a detail view in plan of a modified arrangement of the same parts represented in said Fig. 4; and Fig. 7 is a face view of the same, similar to that represented in said Fig. 5. Fig. 8 is a side elevation of one of the dividing partition plates or walls and a transverse section of the retaining-plate of the molding device; and Fig. 9 is a similar view of the same parts, but of a slightly-modified form of construction. Fig. 10 is a top view of a molding-board and a portion of the retaining-plate and connected partition plates or walls with a top view of one form of centering device or bar for setting each partition plate or wall in its operative and radially fixed position upon the molding-board, and Fig. 11 is a side view of said centering device in its detached relation. Fig. 12 is a top view of a portion of a molding-board provided with a molding device or appliance of a slightly-modified arrangement, showing its application for the purposes of molding bricks which are to be used in a straight or flat arch.

Similar characters of reference are employed in the above-described views to indicate corresponding parts.

The device or appliance to be hereinafter more particularly described may be used for the molding of arch-stones or bricks such as are used in the building of arches of the various kinds, whether for semicircular, segmental, elliptical, pointed, flat, cambered, or inverted arches, and the like; but for the sake of illustration I have shown my novel device in use for molding only the bricks which are employed in circular and flat arches.

Referring now to the several figures of the drawings, the reference character 1 indicates any suitable molding board, table, or bed upon which and with which the molding device or appliance embodying the principles of this invention is to be used substantially in the manner to be presently described. The said molding board or table 1 is preferably made with a center 2 in the form of a small hole or depression and with a center line 3 extending from edge to edge of the said board, table, or bed.

Of course it will be understood that with the different shapes of bricks to be molded for different arches the positions of the centers 2 and the center lines 3 will vary, and, in fact, the center 2 and center line 3 may be entirely omitted, if desired.

The molding device or appliance proper comprises a suitable back or retaining-plate 4, made from a flexible sheet metal or other material suitable for the purposes of this invention. This flexible retaining-plate or back 4 is provided with suitably-disposed holes or perforations 5, preferably of the funnel shape shown in Figs. 4 and 5, in which are loosely-arranged correspondingly-located holding or retaining pins or lugs 7, which extend rearwardly from the narrow edges of suitable partition plates or walls 6. Each holding or retaining pin or lug 7 is provided with a screw-thread and has arranged thereon a nut 8 of any suitable construction, said nuts, however, being preferably the usual thumb-nuts, as shown in the drawings. Each partition plate or wall 6, which may be made of any suitable material, either metal, glass, wood, composition, or the like, is provided upon the lower portion of its opposite narrow edge with a lug or member 9, having a pin or nail receiving hole or perforation 10, substantially as shown and for the purposes to be presently described. In lieu of the partition plates or walls 6, provided with the integral holding or retaining pins or lugs 7, suitable partition plates or walls 11 may be employed, the same being formed with the receiving-slots 12, having the enlarged open parts 13, in which are arranged correspondingly-made pins 14, having their flat heads 15 fitted in said open parts 13 of the slots 12 to prevent longitudinal displacement. These pins 14 are also made with screw-threads and are adapted to be arranged in the holes or perforations 5 of the back or retaining-plate 4, being provided with the nuts 8 in the manner hereinabove described. Lateral displacement of the said retaining-pins from the receiving-slots 12 in the partition-plates 11 may be prevented by an arrangement of pins 14', as indicated in dotted outline in said Fig. 9 of the drawings. The main portions of the plates which form these partitions or walls hereinabove mentioned are of the length and height of the brick desired, and when connected with the said back or retaining-plate 4 the said partition plates or walls are located such distances apart that the space between two consecutively-placed partition-plates will be equal to the width of the brick. In arranging the said molding device or appliance upon the molding board, table, or bed 1 when it is desired to produce the bricks for a semicircular arch (see Fig. 1 of the drawings) the two end partition plates or walls 6 are placed directly upon the center line 3 the required distance apart, according to the size of arch desired, with the flexible back or retaining-plate 4 bent in a semicircle, as shown. The two end partition plates or walls 6 are then securely fastened upon the board, table, or bed 1 by inserting a pin, nail, or screw, as 16, in the receiving holes or perforations 10 of the lugs or members 9 of the respective partition-plates, the said pins, nails, or screws 16 being firmly driven into the molding board, table, or bed. The nuts 8 upon the screw-threaded holding or retaining pins 7 of the said partition plates or walls are then drawn up tightly, and the said back or retaining-plate 4 is then held in the fixed position indicated in Figs. 1 and 4 of the drawings, with the remaining partition-plates 6 loosely extending from the inner curved surface of the said plate, as clearly indicated in said Fig. 4 of the drawings. To arrange and secure the remaining partition plates or walls 6 in their fixed positions upon the molding board, table, or bed 1 on radial lines of a circle whose center is the center or depression 2 and whose circumference is the circularly-bent plate 4, I employ a suitable centering device. (Shown in Figs. 10 and 11 of the drawings.) Any suitable centering device may be employed, the said device shown in the accompanying drawings comprising a post 17, having a screw end or pin 18, which is driven into the center or depression 2. This post 17 is practically of the height of the said partition plates or walls 6 and is provided upon its upper end with a pivot or stud 19. Loosely arranged upon this pivot or stud 19 is the perforated end 21 of a rod or bar 20, which is provided upon its opposite end portion with a guide or other holding portion 22, preferably an inverted letter U in cross-section. This guide or holding portion 22 is arranged upon the upper edge of a loosely-connected partition plate or wall 6, whereby the partition-plate is radially centered and is then secured in its fixed position by driving a pin, nail, or screw 16 through the hole 10 in the lug or member 9 into the board, table, or bed 1 and then tightening the nuts 8, connected with the screw-threaded pins 7 of the said partition plate or wall 6, as will be clearly understood. In this manner all of the said partition plates or walls 6 can be radially secured in their fixed positions, as will be clearly evident. A flexible plate 23, of sheet metal or other suitable material, is then placed upon the upper edges 24 of the said lugs or members 9 and against the circularly-disposed vertical edges 25 of the several partition plates or walls 6, as clearly illustrated in Figs. 1, 2, and 3 of the drawings. That the said plate 23 will be retained in its curved relation against the said edges 25 of the partition plates or walls 6 the end portions 26 of the said plate 23 are passed through correspondingly-formed slots or openings 28 in a pair of posts 27, which are secured upon the board, table, or bed 1 in the positions shown in said Figs. 1 and 2 of the drawings, the said end portions 26 of the said plate 23 being securely held in place by means of one or more setscrews 29, connected with the said posts 27. Of course it will be understood that any other suitably-arranged and other suitably-constructed fastening devices may be employed, if desired.

When all the parts have thus been assembled in their fixed positions upon the molding board, table, or bed 1, a molding device is produced having a number of radially-disposed pockets or chambers, all alike and of a trapezoidal cross-area, in which the material to be molded into arch-stones or bricks is then placed and tamped and then removed therefrom to be dried or baked in the usual manner. Thus arch-stones or bricks are produced with a device of this character which can be readily assembled to provide the desired arch with all the joints between the stones or bricks perpendicular to the soffit or intrados of the arch. If desired, the voussoirs or arch-stones may be made, as shown at the right hand of Fig. 1, so as to provide full and half bricks by forcing suitably-disposed crosspieces 30, of sheet metal or other suitable material, down into the mixture in said pockets, or where said cross-joints are what are termed "blind" joints said cross-pieces are made of narrow widths and are forced but part way into the material, as indicated in the sectional representation in Fig. 3 of the drawings, to produce such result. From an inspection of said Fig. 1 of the drawings it will be seen that the outer marginal end surfaces of the finished bricks on account of the curved arrangement of the retaining-plate 4 will be correspondingly curved, and when it is desired to provide arch-stones or bricks having the usual flat or straight ends then instead of the back or retaining-plate 4 I may use a device of the character shown more particularly in Figs. 6 and 7 of the drawings. In this device the said back or retaining-plate is made up of a number of small plates or sections 31 of the width of the brick desired, the said plates or sections 31 being provided with hinge members or pivot-lugs 32, whereby the said plates or sections 31 can be movably connected in the manner of the leaves or plates of hinges and are capable of an arrangement upon the molding board, table, or bed 1 in a similar manner to the device previously described, the back or retaining-plate instead of being arranged in the arc of a circle forming the angular sides of a polygon, as will be clearly evident. The various partition plates or walls are connected with the said hinged sections or plates 31 by having their screw-threaded pins 7 projecting from between the joints formed by the chamfered edges 33 of the adjacent sections or plates 31 and the various parts being fixed in their operative positions upon the board, table, or bed 1 by means of the pins, nails, or screws 16 and the nuts 8 in the same manner previously described in the construction of the device represented in said Figs. 1 to 6, inclusive.

When the molding apparatus is to be used for the forming or molding of the bricks or arch-stones for a flat or straight arch, partition-plates 34 of various lengths are used with a back or retaining-plate 35, with which such partition-plates are movably connected in the manner previously described and can be secured in their fixed positions upon the molding board, table, or bed 1 by means of the pins, nails, or screws 36, which are passed through the perforated lugs 37 of said partition-plates in the manner hereinabove set forth and as will be clearly understood from an inspection of Fig. 12 of the drawings. The said back or retaining-plate 35 is arranged in a straight line upon the said board, table, or bed 1, and the said partition-plates 34 are arranged at such angles to the said plate 35 that they will be located on imaginary lines which radiate from a common center, the said partition-plates 34 being properly located with the use of a centering rod or bar 20, similar to that shown in Figs. 10 and 11 of the drawings. A straight plate 38 is then arranged upon the lugs 37 of the partition-plates 34 and secured in place by means of the retaining or holding posts 27, all in the manner shown in said Fig. 12, the said posts 27 being of a construction similar to that of the posts 27 represented in Figs. 1, 2, and 3 of the drawings.

From the foregoing description of my invention it will be seen that I have devised a simply-constructed and easily-manipulated molding device which can be quickly arranged in various positions upon a molding board, table, or bed for producing molding-compartments in which the arch-stone or bricks for the several kinds of arches can be easily and correctly formed.

I am aware that some changes may be made in the arrangements and combinations of the devices and parts comprising my present invention, as well as in the details of the construction of the said parts, without departing from the scope of this invention. Hence I do not limit my invention to the exact arrangements and combinations of the devices and parts as described in the foregoing specification and as illustrated in the accompanying drawings; nor do I confine myself to the exact details of the constructions of the parts thereof.

Having thus described my invention, what I claim is—

1. A molding device to be used with a molding board, table or bed, comprising a back or retaining-plate, partition-plates connected with said retaining-plate, a perforated lug extending from each partition-plate, and a fastening-pin in each lug for securing said partition-plates in fixed positions upon the molding board, table or bed, substantially as and for the purposes set forth.

2. A molding device to be used with a molding board, table or bed for the forming of arch-stones or bricks, comprising a flexible back or retaining-plate adapted to be arranged in the form of an arc upon said board, table or bed, partition-plates connected with said retaining-plate, a perforated lug extending from each partition-plate, and a fastening-pin in each lug for securing said partition-plates in fixed positions upon the molding board, table or bed on lines radiating from a common center, substantially as and for the purposes set forth, 3. A molding device to be used with a molding board, table or bed for the forming of arch-stones or bricks, comprising a flexible back or retaining-plate adapted to be arranged in the form of an arc upon said board, table or bed, partition-plates connected with said retaining-plate, means for securing the said partition-plates in fixed position upon the molding board, table or bed on lines radiating from a common center, a plate arranged against the end edges of the said partition-plates, and means in engagement with the end portions of said plate for securing said plate in position, substantially as and for the purposes set forth.

4. A molding device to be used with a molding board, table or bed for the forming of arch-stones or bricks, comprising a flexible back or retaining-plate adapted to be arranged in the form of an arc upon said board, table or bed, partition-plates connected with said retaining-plate, means for securing the said partition-plates in fixed positions upon the molding board, table or bed on lines radiating from a common center, a plate arranged against the end edges of the said partition-plates, and means in engagement with the end portions of said plate for securing said plate in position, consisting, essentially, of screw-posts, each screw-post having a slot in which an end portion of said plate is arranged, and a set-screw for securing said end portions in position in the slots of the screw-posts, substantially as and for the purposes set forth.

5. A molding device to be used with a molding board, table or bed for the forming of arch-stones or bricks, comprising a flexible back or retaining-plate adapted to be arranged in the form of an arc upon said board, table or bed, partition-plates connected with said retaining-plate, a perforated lug extending from each partition-plate, a fastening-pin in each lug for securing said partition-plates in fixed positions upon the molding board, table or bed on lines radiating from a common center, a plate arranged upon the said lugs and against the end edges of the said partition-plates, and means in engagement with the end portions of said plate for securing said plate in position, substantially as and for the purposes set forth.

6. A molding device to be used with a molding board, table or bed for the forming of arch-stones or bricks, comprising a flexible back or retaining-plate adapted to be arranged in the form of an arc upon said board, table or bed, partition-plates connected with said retaining-plate, a perforated lug extending from each partition-plate, a fastening-pin in each lug for securing said partition-plates in fixed positions upon the molding board, table or bed on lines radiating from a common center, a plate arranged upon the said lugs and against the end edges of the said partition-plates, and means in engagement with the end portions of said plate for securing said plate in position, consisting, essentially, of screw-posts, each screw-post having a slot in which an end portion of said plate is arranged, and a set-screw for securing said end portions in position in the slots of the screw-posts, substantially as and for the purposes set forth.

7. A molding device to be used with a molding board, table or bed for the forming of arch-stones or bricks, comprising a back or retaining-plate having perforations, a series of partition-plates, screw-threaded holding-pins extending from each partition-plate and normally loosely arranged in perforations of said retaining-plate, nuts on the projecting ends of said holding-pins for rigidly connecting the partition-plates to said retaining-plate, and means upon the opposite ends of said partition-plates for securing them in their fixed positions upon the molding board, table or bed, substantially as and for the purposes set forth.

8. A molding device to be used with a molding board, table or bed for the forming of arch-stones or bricks, comprising a back or retaining-plate having perforations, a series of partition-plates, screw-threaded holding-pins extending from each partition-plate and normally loosely arranged in perforations of said retaining-plate, nuts on the projecting ends of said holding-pins for rigidly connecting the partition-plates to said retaining-plate, a perforated lug extending from each partition-plate, and a fastening-pin in each lug for securing said partition-plates in fixed positions upon the molding board, table or bed, substantially as and for the purposes set forth.

9. A molding device to be used with a molding board, table or bed for the forming of archstones or bricks, comprising a back or retaining-plate having perforations, a series of partition-plates, screw-threaded holding-pins extending from each partition-plate and normally loosely arranged in perforations of said retaining-plate, nuts on the projecting ends of said holding-pins for rigidly connecting the partition-plates to said retaining-plate, means upon the opposite ends of said partition-plates for securing them in their fixed positions upon the molding board, table or bed, a plate arranged against the end edges of the said partition-plates, and means in engagement with the end portions of said plate for securing said plate in position, substantially as and for the purposes set forth.

10. A molding device to be used with a molding board, table or bed for the forming of archstones or bricks, comprising a back or retaining-plate having perforations, a series of partition-plates, screw-threaded holding-pins extending from each partition-plate and normally loosely arranged in perforations of said retaining-plate, nuts on the projecting ends of said holding-pins for rigidly connecting the partition-plates to said retaining-plate, a perforated lug extending from each partition-plate, a fastening-pin in each lug for securing said partition-plates in fixed positions upon the molding board, table or bed, a plate arranged upon the said lugs and against the end edges of the said partition-plates, and means in engagement with the end portions of said plate for securing said plate in position, substantially as and for the purposes set forth.

11. In a molding appliance, the combination, with a molding board, table or bed, of a molding device comprising a back or retaining-plate, partition-plates movably connected with said back or retaining-plate, a centering device on said molding board, table or bed adapted to be brought in engagement with said partition-plates for arranging them on lines radiating from a common center, and means for securing the centered partition-plates in fixed positions upon the molding board, table or bed, substantially as and for the purposes set forth.

12. In a molding appliance, the combination, with a molding board, table or bed, of a molding device comprising a back or retaining-plate, partition-plates movably connected with said back or retaining-plate, a centering device on said molding board, table or bed adapted to be brought in engagement with said partition-plates for arranging them on lines radiating from a common center, a perforated lug extending from each partition-plate, and a fastening-pin in each lug for securing said partition-plates in fixed positions upon the molding board, table or bed, substantially as and for the purposes set forth.

13. In a molding appliance, the combination, with a molding board, table or bed, of a molding device comprising a back or retaining-plate, partition-plates movably connected with said back or retaining-plate, a centering device on said molding board, table or bed adapted to be brought in engagement with said partition-plates for arranging them on lines radiating from a common center, means for securing the centered partition-plates in fixed positions upon the molding board, table or bed, a plate arranged against the end edges of the said partition-plates, and means in engagement with the end portions of said plate for securing said plate in position, substantially as and for the purposes set forth.

14. In a molding appliance, the combination, with a molding board, table or bed, of a molding device comprising a back or retaining-plate, partition-plates movably connected with said back or retaining-plate, a centering device on said molding board, table or bed adapted to be brought in engagement with said partition-plates for arranging them on lines radiating from a common center, a perforated lug extending from each partition-plate, a fastening-pin in each lug for securing said partition-plates in fixed positions upon the molding board, table or bed, a plate arranged upon the said lugs and against the end edges of the said partition-plates, and means in engagement with the end portions of said plate for securing said plate in position, substantially as and for the purposes set forth.

In testimony that I claim the invention set forth above I have hereunto set my hand this 26th day of October, 1904.

JAMES P. HALL.

Witnesses:
    FREDK. C. FRAENTZEL,
    GEO. D. RICHARDS.